Figure 1:
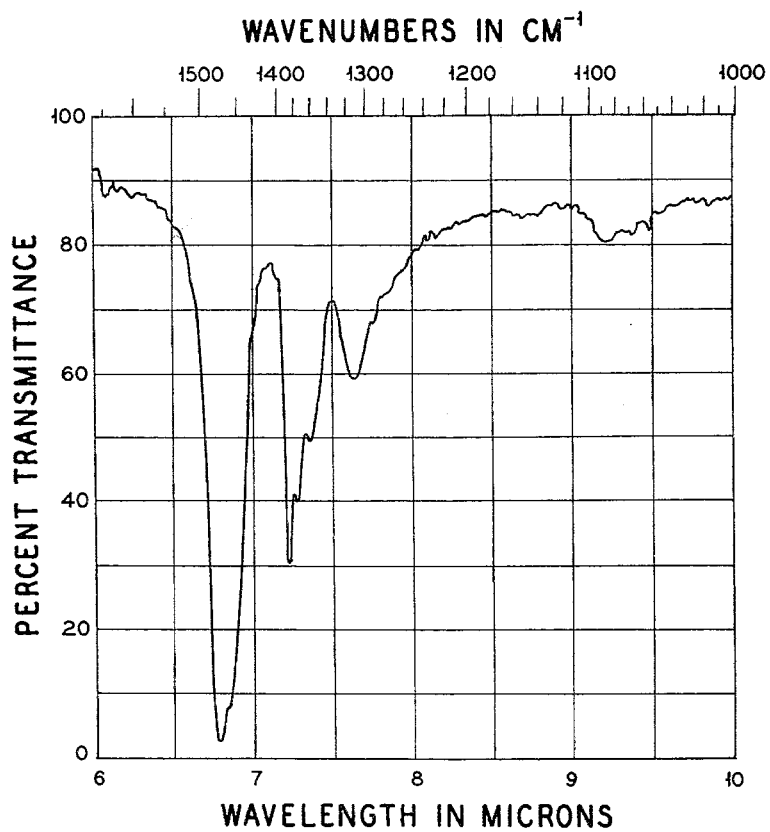

July 27, 1965 F. P. REDING ETAL 3,197,449
COPOLYMERIZATION PROCESS USING A FREE-RADICAL CATALYST
Filed July 27, 1960 3 Sheets-Sheet 1

INVENTORS
FREDERICK P. REDING
EDGAR W. WISE
BY Francis M. Fazio
ATTORNEY

INVENTORS
FREDERICK P. REDING
EDGAR W. WISE

United States Patent Office 3,197,449
Patented July 27, 1965

3,197,449
COPOLYMERIZATION PROCESS USING A
FREE-RADICAL CATALYST
Frederick P. Reding, Charleston, and Edgar W. Wise, South Charleston, W. Va., assignors to Union Carbide Corporation, a corporation of New York
Filed July 27, 1960, Ser. No. 45,638
4 Claims. (Cl. 260—88.2)

This invention relates to a process for producing copolymers. More particularly it is concerned with a process for producing copolymers of ethylene and an alpha olefin at very high pressures.

Solid copolymers of ethylene and an alpha olefin have recently been produced at relatively low pressures, atmospheric or slightly above, and relatively low temperatures, by the use of catalyst complexes discovered by Dr. Karl Ziegler and his co-workers. These catalyst complexes consist, among others, of an organo metallic compound wherein the metal is a metal belonging to Groups IA, IIA, or IIIB of the Periodic Chart of the Atoms (1956 edition, published by W. M. Welch Manufacturing Company, Chicago, Illinois), and a halide of a transition metal belonging to Groups IVA, VA, or VIA of the Periodic Chart. Prior to Dr. Ziegler's discovery, however, no one had succeeded in producing true copolymers of ethylene and an alpha olefin, even though much time and expense were put into such attempts. A disadvantage of Dr. Ziegler's process, however, is that large amounts of low molecular weight waxes are often produced which have to be removed; also the catalyst components become embedded in the polymer as a residue which must be removed.

It is also known that ethylene will undergo the telomerization reaction with various compounds including alpha olefins at pressures up to about 40,000 p.s.i. to produce telomers. The nature of this telomerization reaction, which is essentially a transfer or chain terminating reaction, has been clearly defined in United States Letters Patent No. 2,395,292. Telomerization is therein defined as the process of reacting, under polymerization conditions, a molecule YZ, which is called a "telogen," with more than one unit of a polymerizable compound having ethylenic unsaturation, called a "taxogen," to form products called "telomers," having a new carbon to carbon bond and the formula $Y(A)_nZ$, wherein $(A)_n$ is a divalent radical formed from a plurality of taxogen molecules, the unit A being called a "taxomon," $n$ being any integer greater than 1 and Y and Z being fragments of the telogen attached terminally to the chain of taxomons. The patentee further states that telomerization is not to be confused with interpolymerization, or copolymerization.

The telomers produced by the telomerization of ethylene and an alpha olefin are easily distinguished from true copolymers in that the telomers will not show an absorption band in the infrared spectrum for the branches due to the second alpha olefin, whereas the true copolymers do as can be seen from the drawings which are infrared spectra of a homopolymer, an ethylene-propylene telomer, and an ethylene/propylene copolymer of this invention.

FIGURE 1 is a drawing of a portion of the infrared curve, between 6 and 10 microns, obtained on a 4.5 mil film of homopolymeric polyethylene, using a sodium chloride prism for the analysis. The polyethylene was produced in a manner similar to that described in Example 1(A) of this specification. There is no evidence of methyl branching in the 8.4 to 8.7 microns range.

Figure 2:
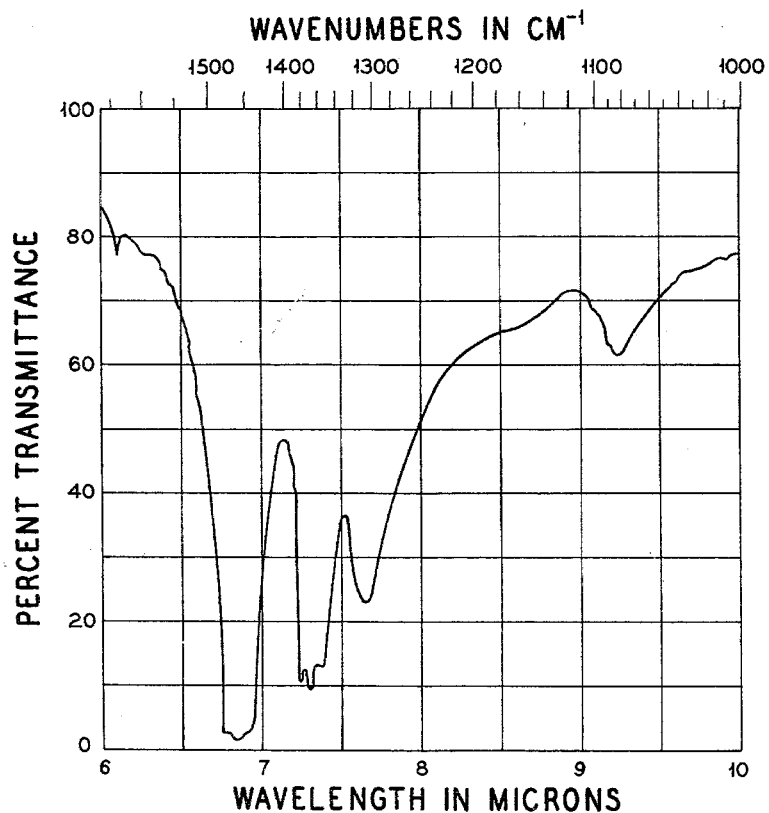

FIGURE 2 is a drawing of a portion of the infrared curve, between 6 and 10 microns, obtained on an 8 mil film of the ethylene-propylene telomer produced in Example 1(A) of this specification. There is no evidence of methyl branching in the 8.4 to 8.7 microns range, indicating that a telomer and not a copolymer was produced at a polymerization pressure of about 30,000 p.s.i.

Figure 3:
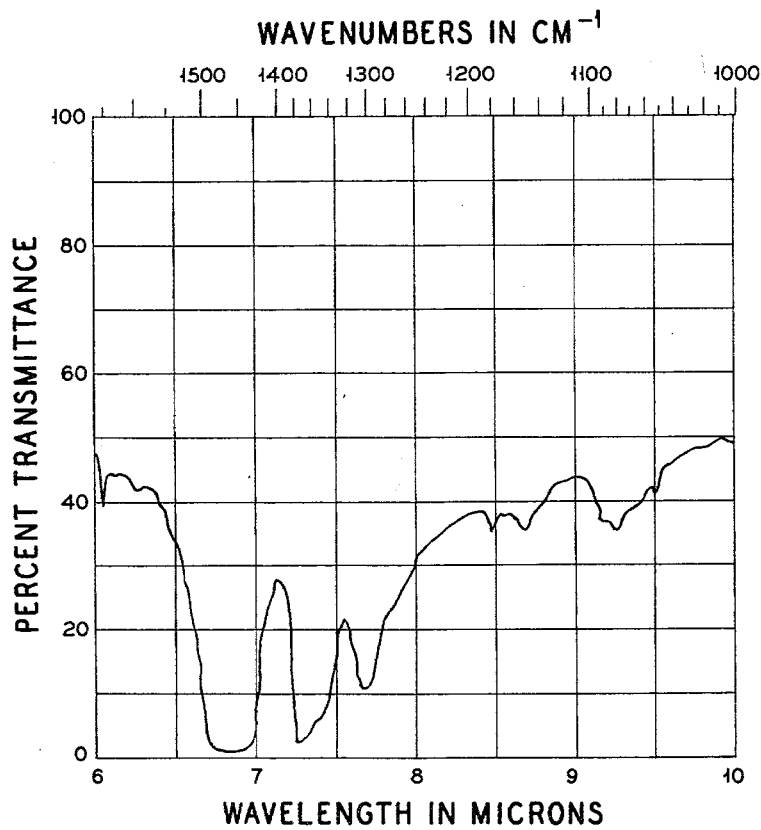

FIGURE 3 is a drawing of a portion of the infrared curve, between 6 and 10 microns, obtained on a 16 mil film of the ethylene/propylene copolymer produced in Example 2 of this specification. The presence of methyl branching as shown by the peaks in the 8.4 to 8.7 microns range is clearly evident and is positive evidence that a true copolymer was produced. The methyl branching in the copolymer molecule is due to copolymerized propylene; a comparison of the three infrared curves shows that adsorption due to branching is exhibited only by the true copolymer produced by the process of this invention.

It has now been found that true copolymers of ethylene and an alpha olefin, which for the purposes of this invention is defined as an unsaturated hydrocarbon of the formula $C_nH_{2n}$ containing at least 3 carbon atoms wherein the unsaturation is between the alpha and beta carbon atoms, can be produced by reacting a mixture of ethylene and alpha olefin with a free radical polymerization catalyst at a pressure of at least about 50,000 p.s.i. That true copolymers are formed and not simply telomers is readily proven by infrared analysis of the copolymers produced by the process of this invention. Infrared analysis of the copolymers of this invention shows the characteristics of branching on the polymer chain due to true copolymerization of the alpha olefin. For example, methyl branching at 8.7 microns with propylene as the comonomer, ethyl branching at 13.0 microns with butene-1, and isopropyl branching at 12.0 microns with 3-methylbutene-1.

In the case of the telomerization reaction, terminal vinyl unsaturation is present as shown by the infrared adsorption band at 11.0 microns. This results from the terminal attachment of fragments of the telogen to the end of the polymer chain, as represented by the following equation in which propylene is employed for exemplary purposes:

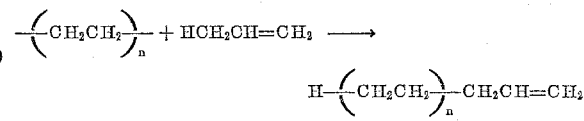

By the processes of this instant invention, the telomerization reaction, although still occurring, does so to only a minor extent as compared to the true copolymerization reaction. This is shown by a much lower concentration of terminal vinyl groups in the copolymer in relation to the concentration of chain branches arising from the true copolymerization. The true copolymers produced herein are formed by formation of a new carbon-carbon bond with the unsaturated carbon atoms of the alpha olefin comonomer rather than with the saturated carbon atom which is alpha to the unsaturated carbon atom. The reaction that takes place by the instant process can be represented by the following equation, again using propylene for exemplary purposes:

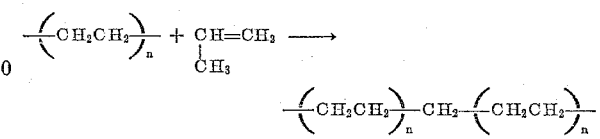

The minimum pressure employed in the process of this invention is critical and a minimum pressure of about 50,000 p.s.i. is necessary to obtain true copolymerization rather than simple telomerization. Below this pressure telomerization occurs, whereas above 50,000 p.s.i. pressure, true copolymerization as herein defined is the main reaction. The maximum pressure which can be used is restricted solely by the limitations imposed by the equipment, and pressures of from about 50,000 p.s.i. to about 125,000 p.s.i. or higher can be readily employed. The preferred pressure ranges are from about 70,000 p.s.i. to about 100,000 p.s.i. The temperature of the reaction can be from about 70° C. to about 250° C., with temperatures of from about 100° C. to about 225° C. preferred. A balance of pressure, temperature, and reactant concentrations must be achieved to prevent decomposition; this is well known in the art among those skilled in polymerization reactions.

The concentration of the alpha olefin charged is from about 3 to about 40 mole percent of the feed. The preferred concentration of alpha olefin in the feed is from about 5 to about 30 mole percent. Among the alpha olefins which can be copolymerized with ethylene are those containing from 3 to about 12 carbon atoms; preferably from 3 to about 6 carbon atoms. Illustrative of such alpha olefins are propylene, n-butene, n-pentene, n-hexene, 3-methylbutene-1, 4-methylpentene-1, 2-ethylhexene-1, n-decene, n-dodecene, and the like.

The catalysts suitable for use in this invention are the free radical catalysts. The term "free radical catalyst" is used herein to refer to compounds which contain the —O—O— or —N=N— structural linkages or are capable of forming these linkages by the action of dilute inorganic acids. As suitable catalysts one may employ oxygen; hydrogen peroxide; acyl or aroyl peroxides such as benzoyl peroxide, acetyl peroxide, lauroyl peroxide, tertiary butyl peroxide, di-tertiary butyl peroxide, di-benzoyl peroxide, methyl benzoyl peroxide, acetyl benzoyl peroxide; peracetic acid; alkali metal persulfates, e.g., sodium and potassium persulfates; alkali metal and ammonium perborates and percarbonates; azobisbutyronitrile, and so forth. The concentration of the free radical catalyst can be varied from about 10 parts per million to about 5,000 parts per million; the preferred catalyst concentration is from about 25 parts per million to about 250 parts per million, based on the monomers feed charged.

The polymerization reaction can be carried out continuously in a tubular reactor, semi-continuously, or batch-wise. In any event, vigorous agitation and good cooling are necessary to provide for the rapid removal of the heat of polymerization.

The ethylene used should have an ethylene content of about 90 percent by weight, and preferably above 95 percent by weight, the remainder consisting of other hydrocarbons, most of which are inert, for example, ethane and propane. Trace amounts of other impurities, for example, carbon dioxide and acetylene can also be tolerated. The same qualifications are applicable to the alpha olefins employed.

The copolymers produced by the processes of this invention have a copolymerized alpha olefin content in the polymer of at least one mole percent. The copolymers can be produced having wide density and melt index ranges by varying the concentrations of the reactants and the polymerization conditions. The alpha olefin content is readily determined by infrared analysis for the branch group attached to the polymer chain. Melt index is determined by the method described in ASTM D-1238-52T; and density by the method of E. Hunter and W. G. Oaks, Trans. Faraday Soc., 41, 49 (1945).

The copolymers of ethylene and an alpha olefin of this invention can be used to produce films, fibers, coatings, extrusions, moldings, and so forth, and possess physical properties superior to those of the telomers heretofore produced.

The following examples further serve to define the invention but are not to be construed as limitative thereof.

Example 1

A mixture of ethylene containing 3 mole percent propylene and about 75 parts per million of oxygen was compressed to 60,000 p.s.i. in a static tube reactor 40 inches long having an inside diameter of 5/16 inch. The temperature was raised to 199° C., and the pressure in the reactor was maintained at 60,000 p.s.i. by the injection of more feed. After 15 minutes reaction time the polymerization products and unreacted monomers were passed into a three liter cylinder containing acetone. Unreacted monomers were bled off, and the resin slurry was filtered. The dried copolymer of ethylene and propylene weighed 0.96 gram. This procedure was repeated twice again, and the three products were composited, yielding 3.02 grams of copolymer. The copolymer had a melt index of 1.12 decigrams per minute at 190° C., and a density of 0.9304 gram/cc. Infrared spectrum showed the presence of methyl branching at 8.7 microns, which analyzed for a propylene content of 1.5 mole percent in the copolymer.

Example 1(A)

The above reaction was repeated at 30,000 p.s.i. pressure using the same feed of ethylene containing 3 mole percent propylene. A yield of 1.44 grams of resin was obtained, whose infrared spectrum failed to show any absorption at the 8.7 micron range, which is the characteristic of copolymerized propylene. The terminal vinyl unsaturation band at 11.0 microns was present.

Example 2

Ethylene, which had been treated by passing it through reduced copper oxide at 150° C. to lower the oxygen content, and containing 2.9 mole percent propylene, was compressed at 100,000 p.s.i. at a temperature of 197° C. The reactor tube was similar to that described in Example 1. The heat of polymerization caused a sudden temperature rise of 18° C. within the reactor, and then the temperature gradually fell back to 197° C. A yield of 2.02 grams of white copolymer of ethylene and propylene was obtained. After repeating this procedure two more times, the copolymers were combined to give 6.52 grams of ethylene/propylene copolymer having a melt index of 3.6 decigrams per minute and a density of 0.930. Infrared analysis showed a propylene content of 2.7 mole percent.

Example 3

A mixture of ethylene containing 28.2 mole percent propylene was compressed to about 98,000 p.s.i. This mixture was treated for ten minutes at 195° C. in a manner similar to that described in Example 1. There was obtained 1.24 grams of a slightly tacky granular ethylene/propylene copolymer which contained 29 mole percent propylene by infrared analysis.

Example 4

A mixture of ethylene containing 3.8 mole percent butene-1 and about 75 parts per million oxygen was compressed to 50,000 p.s.i. This mixture was polymerized for about 25 minutes at 197° C. in a manner similar to that described in Example 1. Three such runs yielded 0.81 gram of a white copolymer of ethylene and butene-1 having a melt index of 9.8 decigrams per minute and a density of 0.938 gram/cc. Infrared analysis showed the presence of ethyl branching indicating that butene-1 had copolymerized.

Example 5

The same feed mixture used in Example 4 was polymerized at 100,000 p.s.i. and 198° C. in the same manner as described in Example 4. A yield of 1.79 grams of a white ethylene/butene-1 copolymer was obtained having a melt index of 179 and a density of 0.940 gram/cc. Infrared analysis showed a medium absorption band at 13 microns due to ethyl branching, indicating that the butene-1 had copolymerized with the ethylene.

Example 6

A feed mixture of ethylene containing 11 mole percent butene-1 and about 75 parts per million oxygen was compressed to about 80,000 p.s.i., and then polymerized at that pressure and at a temperature of about 197° C. in a manner similar to that described in Example 1. Three such runs were carried out to yield a total of 2.52 grams of the copolymer of ethylene and butene-1. The copolymer had a specific viscosity of 0.0971 as determined from a 0.4 gram solution of the resin in 100 cc. of methylcyclohexane at 70° C.; the density of the resin was 0.9162 gram/cc. Infrared analysis showed strong ethyl branching at 13 microns indicative of the formation of a copolymer of ethylene and butene-1.

*Example 7*

A mixture of ethylene containing 5.5 mole percent of 3-methylbutene-1 and about 75 parts per million of oxygen was compressed to 100,000 p.s.i. This mixture was polymerized for about 7 minutes at 198° C. in a manner similar to that described in Example 1. This experiment was repeated and the two products obtained were combined to give 1.08 grams of a copolymer of ethylene and 3-methylbutene-1 having a density of 0.9375 gram/cc. Infrared analysis of the copolymer showed an absorption band at 12 microns attributable to the isopropyl group present in the 3-methylbutene-1 structure.

*Example 8*

A steel cylinder having a capacity of about 3 liters was evacuated. Then 217 parts of benzene containing 0.45 part benzoyl peroxide was drawn in. The cylinder was charged with 61 parts of butene-1 and 1013 parts of ethylene having an oxygen content of about 75 parts per million. After thoroughly mixing the contents, the charge was pumped in the liquid phase into the static tube reactor of Example 1 at a pressure of 100,000 p.s.i. and held at 101° C. for 30 minutes. The ethylene/butene-1 copolymers obtained from three such runs were combined and had a density of 0.9574 gram/cc. Infrared analysis showed strong absorption at 13 microns indicating that the butene-1 had formed a true copolymer of ethylene and butene-1 rather than a telomer.

What is claimed is:

1. A process for producing a solid copolymer of ethylene and an alpha olefin containing from 3 to about 12 carbon atoms, which comprises reacting a mixture consisting of ethylene and from about 3 to about 40 mole percent of said alpha olefin with a free radical polymerization catalyst at a pressure of from about 70,000 p.s.i. to about 125,000 p.s.i. and a temperature of from about 70° C. to about 250° C.; said copolymer having a content of said alpha olefin of at least 1 mole percent.

2. A process for producing a solid copolymer of ethylene and propylene, which comprises reacting a mixture consisting of ethylene and from about 3 to about 40 mole percent of propylene with a free radical polymerization catalyst at a pressure of from about 70,000 p.s.i. to about 100,000 p.s.i. and a temperature of from about 100° C. to about 225° C.; said copolymer having a propylene content of at least 1 mole percent as evidenced by absorption due to methyl branching at 8.7 microns by infrared analysis.

3. A process for producing a solid copolymer of ethylene and butene-1, which comprises reacting a mixture consisting of ethylene and from about 3 to about 40 mole percent of butene-1 with a free radical polymerization catalyst at a pressure of from about 70,000 p.s.i. to about 100,000 p.s.i. and a temperature of from about 100° C. to about 225° C.; said copolymer having a butene-1 content of at least one mole percent as evidenced by absorption due to ethyl branching at 13 microns by infrared analysis.

4. A process for producing a solid copolymer of ethylene and 3-methylbutene-1, which comprises reacting a mixture consisting of ethylene and from about 3 to about 40 mole percent of 3-methylbutene-1 with a free radical polymerization catalyst at a pressure of from about 70,000 p.s.i. to about 100,000 p.s.i. and a temperature of from about 100° C. to about 225° C.; said copolymer having a 3-methylbutene-1 content of at least 1 mole percent as evidenced by absorption due to isopropyl branching at 12 microns by infrared analysis.

References Cited by the Examiner

UNITED STATES PATENTS

| | | | |
|---|---|---|---|
| 2,200,429 | 5/40 | Perrin | 260—882 |
| 2,396,785 | 3/46 | Hanford | 260—94.9 |
| 2,396,791 | 3/46 | Krase et al. | 260—94.9 |
| 2,816,883 | 12/57 | Larcher | 260—94.9 |

JOSEPH L. SCHOFER, *Primary Examiner.*

MORRIS LIEBMAN, *Examiner.*

UNITED STATES PATENT OFFICE
CERTIFICATE OF CORRECTION

Patent No. 3,197,449                     July 27, 1965

Frederick P. Reding et al.

It is hereby certified that error appears in the above numbered patent requiring correction and that the said Letters Patent should read as corrected below.

Column 2, lines 62 and 63, the formula should appear as shown below instead of as in the patent:

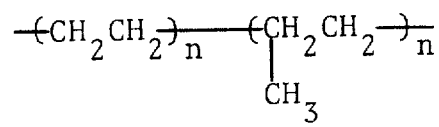

Signed and sealed this 18th day of January 1966.

(SEAL)
Attest:

ERNEST W. SWIDER                     EDWARD J. BRENNER
Attesting Officer                      Commissioner of Patents